United States Patent [19]

Casey

[11] 3,867,231
[45] Feb. 18, 1975

[54] TIRE BUILDING MACHINE
[75] Inventor: William R. Casey, Akron, Ohio
[73] Assignee: The Goodyear Tire & Rubber Company, Akron, Ohio
[22] Filed: June 28, 1972
[21] Appl. No.: 266,885

[52] U.S. Cl................ 156/415, 156/132, 156/398, 156/416, 156/420
[51] Int. Cl....................... B29h 17/16, B29h 17/26
[58] Field of Search........... 156/414, 415, 416, 417, 156/131, 132, 135, 398, 400, 403, 420

[56] References Cited
UNITED STATES PATENTS

| | | | |
|---|---|---|---|
| 2,979,110 | 4/1961 | Henley.............................. | 156/415 |
| 3,160,545 | 12/1964 | Burton.............................. | 156/415 |
| 3,188,260 | 6/1965 | Nebout.............................. | 156/415 |
| 3,374,138 | 3/1968 | Porter et al....................... | 156/417 |
| 3,433,695 | 3/1969 | Caretta et al..................... | 156/415 |
| 3,467,567 | 9/1969 | Woodhall et al.................. | 156/415 |
| 3,489,634 | 1/1970 | Pizzo et al. ...................... | 156/415 |
| 3,637,450 | 1/1972 | Bryant.............................. | 156/417 |
| 3,644,162 | 2/1972 | Appleby et al. .................. | 156/420 |
| 3,740,293 | 6/1973 | Jones et al....................... | 156/403 |

FOREIGN PATENTS OR APPLICATIONS
983,349   2/1965   England.............................. 156/414

Primary Examiner—Clifton B. Cosby
Assistant Examiner—John E. Kittle
Attorney, Agent, or Firm—F. W. Brunner; R. S. Washburn

[57] ABSTRACT

Apparatus for building a tire having a circumferentially inextensible belt, and particularly a multi-condition tire building drum providing in an intermediate condition, a high crown firmly supported for stitching a cylindrical tire band, a radially expansible sleeve secured radially on and extending axially between a pair of drum end assemblies movable toward and away from each other and cooperating with the sleeve to form a chamber into which air is admitted to expand the sleeve into toroidal form as the end assemblies are moved toward one another, bead locating segment assemblies adjacent to and axially outboard of the sleeve ends to locate beads of the tire in firm axial and concentric position as the tire is shaped from a cylindrical to a toroidal form and particularly useful in securing the beads in proper location during conventional stitching operations. The drum features expansion of the internal supporting segments by rotation of scroll plates each having a plurality of spiral cam grooves by which the segments are moved radially inwardly and outwardly.

28 Claims, 8 Drawing Figures

TIRE BUILDING MACHINE

The foregoing abstract is not to be taken as limiting the invention of this application, and in order to understand the full nature and extent of the technical disclosure of this application, reference must be made to the accompanying drawing and the following detailed description.

This invention relates to an improved tire building drum and particularly to an expandable, collapsible tire building drum for building a tire having an inextensible circumferential belt.

A principal object of the invention is the provision of a tire building drum on which a tire can be more accurately built, the drum having in a first condition a firm, continuously supported, cylindrical surface and in a second condition a toroidal surface wherein the tire carcass is supported to receive an inextensible endless belt and including means for firmly and securely positioning the bead portions of the tire against inappropriate displacement during shaping and stitching.

While the subject matter considered by the applicants to comprise the invention is particularly pointed out in the appended claims, a presently preferred embodiment of the invention, which will make apparent to persons skilled in the art the paticular features and advantages thereof, will be described herein in connection with the accompanying drawings, in which:

Figure 1:
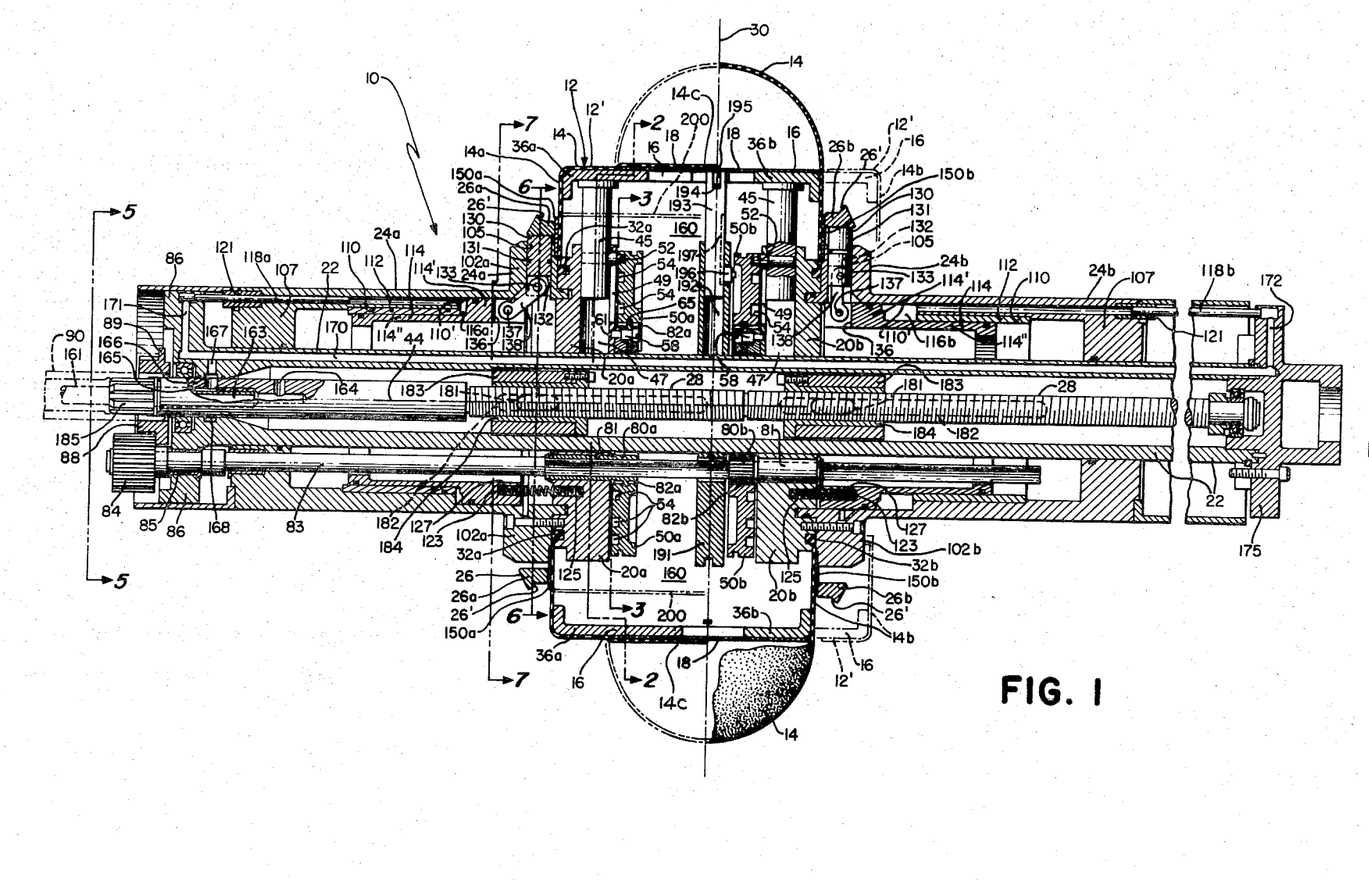
FIG. 1 is a composite axial elevation in section illustrating both structure and operation of the preferred apparatus according to the invention.

The drawings, and referring particularly to FIG. 1, illustrate a preferred form of tire building apparatus according to the invention. The apparatus 10 includes drum 12 comprising a sleeve 14, a plurality of segments 16 which cooperate with a plurality of cover plates 18 to provide firm continuous cylincrical support to the sleeve 14 in one configuration 12' or condition of the drum. The sleeve 14 is formed with radially inwardly turned end portions 14a and 14b which are secured airtightly to the respective rigid end bodies 20a and 20b which are mounted coaxially of and corotatably on a hollow cylindrical center shaft 22 for movement axially toward and away from each other.

The cylindrical housings 24a and 24b are secured airtightly respectively to the end bodies 20a and 20b to extend coaxially outwardly of the sleeve oppositely of one another. The respective housings 24a and 24b provide, as will presently be described in more detail, means for mounting the bead locating segments 26 in groups 26a and 26b. An axial drive screw shaft 28 having right and left-hand screw threads is disposed coaxially in the center shaft 22 to move the end bodies 20a and 20b toward and away from each other symmetrically with respect to the mid-circumferential plane 30.

The sleeve 14 is a single wall, radially extensible, tubular member of elastomeric material having limited axial extensibility provided by reinforcement cords extending axially inwardly from each end toward the central zone 14C of the sleeve. The central zone is not provided with axial cord reinforcement. The ends 14a, 14b are fixed radially in the grooves 32a and 32b, respectively.

Figure 2:
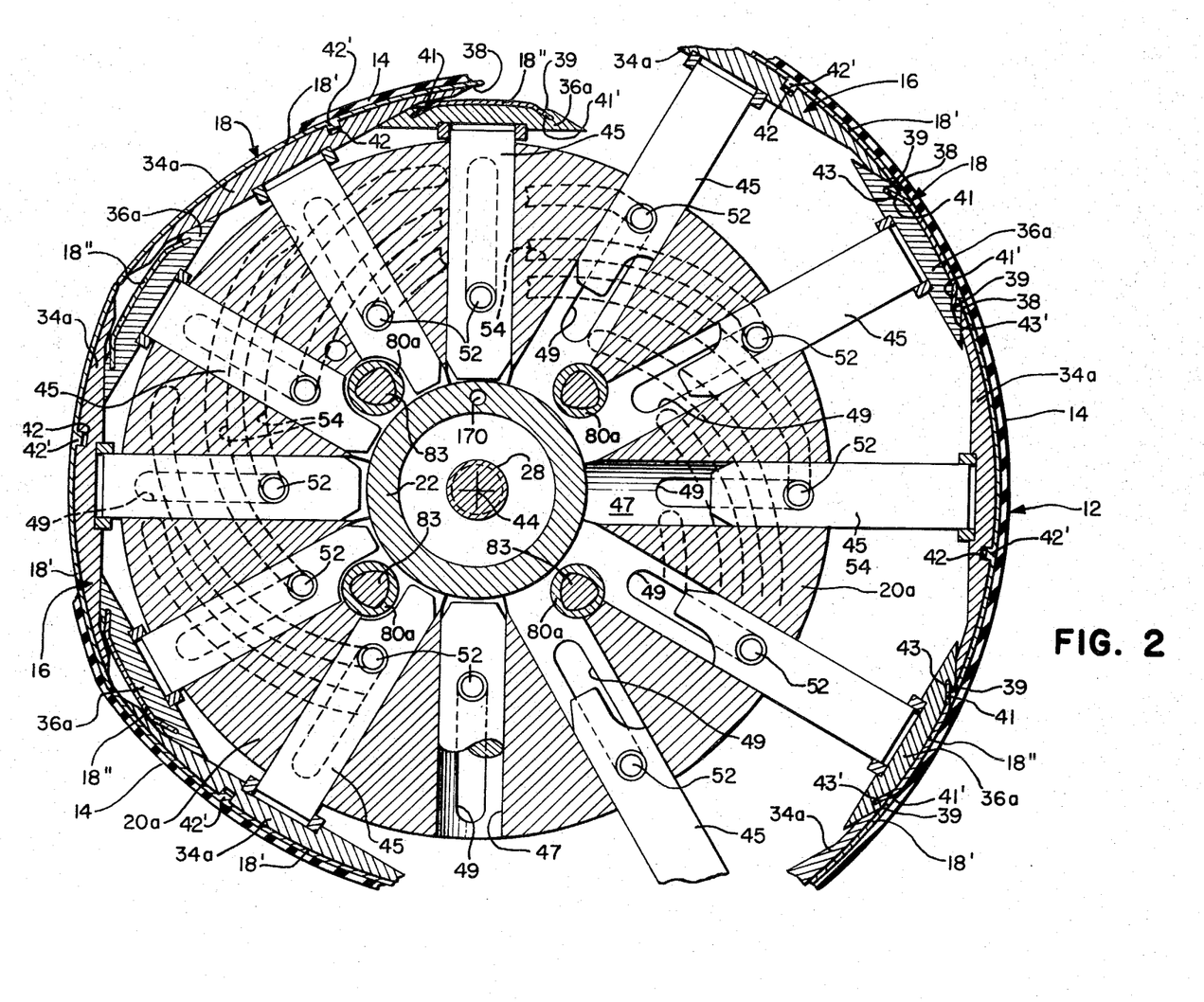
FIG. 2 is a composite view in cross-sectional elevation illustrating two conditions of the apparatus of FIG. 1 with reference to the second line 2—2 therein.

The plurality of segments 16, referring also to FIG. 2, include a first set of segments of greater acruate width 34a and 34b and a second set of segments of lesser arcuate width 36a and 36b disposed in alternating circumferential sequence respectively about the end bodies 20a and 20b. The segments of the sets 34a and 34b are paired in axial alignment with each other, as are the segments of the sets 36a and 36b. In FIG. 2, a portion of the segments 16 are shown in their radially collapsed condition; another portion of the segments 16 (corresponding to the part of the drum in front of the axial section seen in FIG. 1) are shown in their radially extended condition.

The plurality of cover plates 18 are all held in an axially fixed position and include a first set of cover plates 18' each overlying a respectively aligned pair of the segments 34a and 34b. The respective segments 16 support the cover plates in all radial positions assumed by the plates 18 and move axially in sliding contact without displacing the plates. The cover plates 18' each have axially extending edge portions 38 which, in the radially extended condition of the segments 16, overlie the adjacent axially extending edges 39 of the respectively circumferentially adjacent segments 36a and 36b. The cover plates 18'' each overlie an axially aligned pair of segments 36a and 36b and have axial extending edge portions 41 and 41' turned or deformed inwardly to interengage slidably respectively the axially extending slots 43 and 43' formed in each of the segments 36a and 36b. The slots 43 and 43' extend the full axial length of each of the segments 36a and 36b and inwardly from the circumferential surfaces thereof each at an acute angle with respect to an axial plane of the drum aligned with the slot, the respective angles being opposite each other. The arrangement serves effectively to maintain the cover plates 18'' in both axial alignment and close radial association with the respective segments 36a, 36b. Each of the segments 34a, 34b has a key slot 42 extending parallel to the axis 44 in which slide key-like projections 42' fixed on the respectively associated cover plates 18' to maintain the parallel alignment of the cover plates 18'.

Each of the individual segments 16 is provided with a pattern (not shown) of alternating finger and slots extending parallel with the rotation axis 44 of the drum and arranged so as to interdigitate with the slots and fingers of the corresponding axially aligned segment 16 in known manner, the arrangement providing for maximum axial movement of the respective segments toward and away from the plane 30 and at the same time for radial support of the respectively associated cover plates 18 during both radial and axially relative movement of segments and cover plates.

To support the segments 16 and to guide their movement radially of the axis, radial guide members 45 are rigidly fixed one on each segment, each guide member being radially slidable in a respective guideway 47. The guideways 47 are formed in a coplanar radial equally spaced array in each end body 20a, 20b. A slot 49, open from each guideway 47 outward through the axially inner wall of the end body, extends radially parallel to the guideway to accommodate the radial movement of the respective cam follower pins 52. A pin 52, which can be rotatably mounted, is fixed on each guide member 45 and extends through and inwardly of the end body wall toward the other end body in an axial direction.

Figure 3:
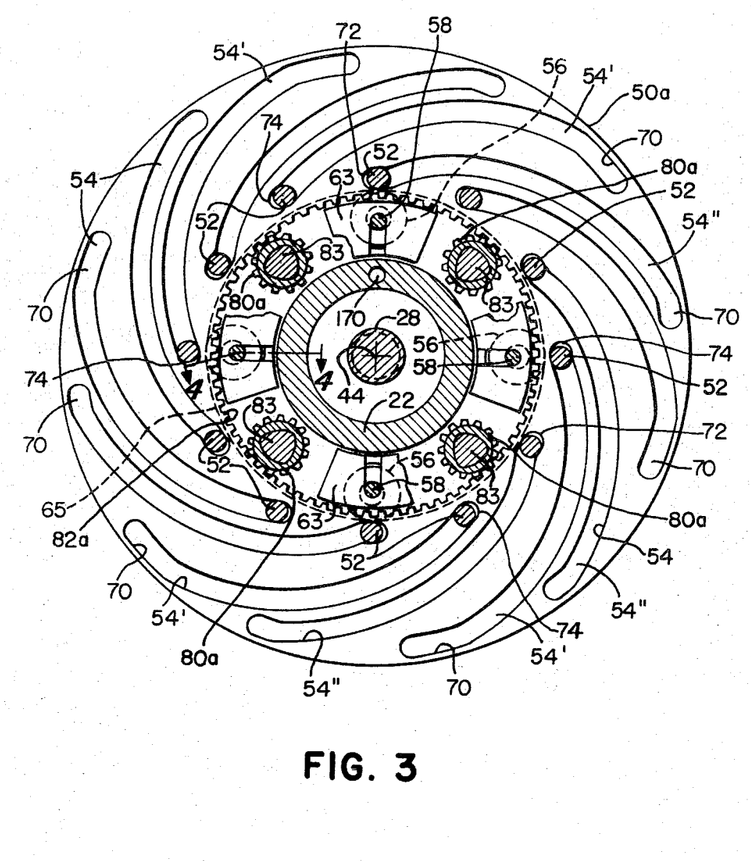
FIG. 3 is a view of a portion of the apparatus of FIG. 1 with reference to the second line 3—3 in FIG. 1.

Referring also to FIG. 3; to move the segments 16 radially, according to the invention, a scroll plate 50a, 50b is mounted for coaxial rotation relatively of the end bodies 20a and 20b and for axial movement together with the respective end body. Formed in the annular face of each scroll plate 50a, 50b, a plurality of spiral cam grooves 54 individually engage respectively associated cam follower pins 52. The segments 16 are moved radially outwardly in rsponse to rotation of the scroll plates, "top going" in FIG. 1 and anticlockwise in FIG. 3 and are moved inwardly in response to clockwise (FIG. 3) rotation of the scroll plates, relative to the respective end bodies 20a, 20b.

Figures 4, 6:
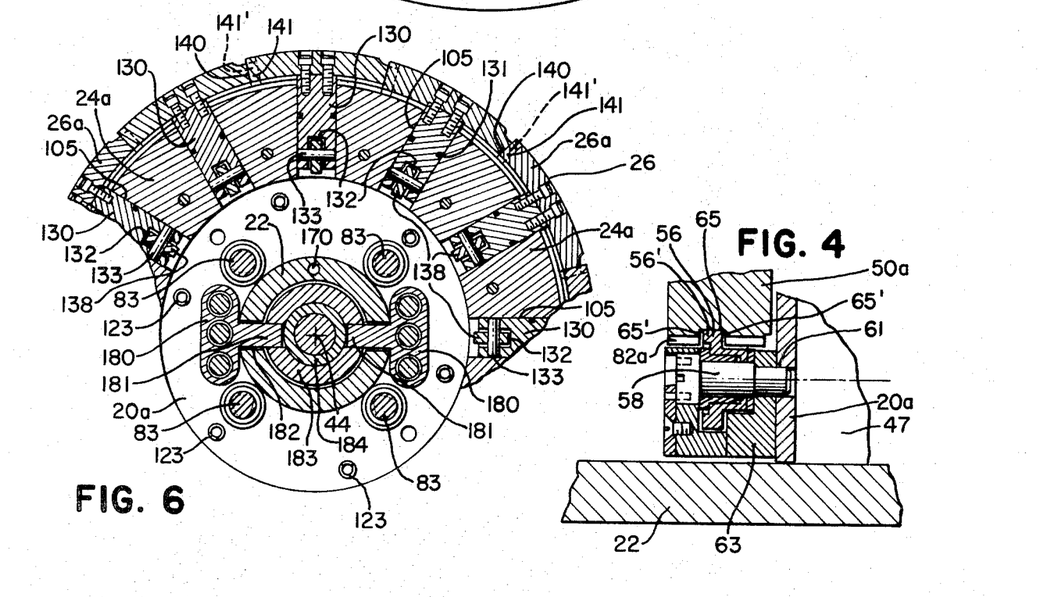
FIG. 4 is a view in cross-section of a portion of the apparatus of FIG. 1 with reference to the section line 4—4 in FIG. 3.
FIGS. 6 and 7 are partial end section views of the apparatus of FIG. 1 with reference respectively to the section lines 6—6 and 7—7 therein.

Each scroll plate 50a, 50b is mounted in an identical manner on its associated end body 20a, 20b. A description of the mounting of scroll plate 50a will, therefore, suffice to describe both. Referring to FIG. 4, the scroll plate 50a is mounted for coaxial movement together with the end body 20a and for rotation with respect thereto coaxially about the drum axis 44 by a plurality of flanged wheels 56 each carried rotatably on a pin engaged in a pilot hole 61 in the end body 20a and supported by a block assembly 63 secured to the body 20a. The flange 56' of the wheel engages the periphery of an annular groove 65 formed in the inner circumference of the scroll plate 50a while the sides of the flange 56' engage the sides 65' of the groove. Each pin 58 is eccentric with respect to its pilot hole 61, an arrangement which enables adjustment of the position of each wheel 56 radially of the axis 44, by rotating the pins 58 in the pilot hole 61, to facilitate both assemly of the drum and precise concentric location of the scroll plate.

The grooves 54 in the scroll plate 50a each extend over a rotation angle of about 75°–90°, and preferably 80°–82°. The angle of rotation subtended by any one groove can be as desired, taking note of the fact that too great an angle results in insufficient metal between the grooves to provide adequate support to the follower pins 52 and that too small an angle will result in excessive torque required to raise the individual segments 16 relative to the axis. The radially outward terminal portions 70 of the grooves 54 include portions not spiral but circular arcs concentric with the drum axis and of equal radii. The segments 16, in their radially outward positions, are there firmly held against radially inward displacement by the engagement of the pins 52 with the circular arc portion of the respective grooves. The plurality of grooves 54 includes a first set of grooves 54' each engaging a pin 52 to move a respective one of the first set of segments 34a, 34b and a second set of grooves 54" each engaging a pin 52 acting on a respective one of the segments 36a, 36b. The inward terminal portions 72 of the second set of grooves 54" extend in circular arcs concentric with the axis 44 at a lesser radius than the radii of the terminal portions 74 of the first set of grooves 54'. The arrangement enables the segments 36a, 36b to begin radially inward movement in response to rotation of the scroll plate before inward movement of the segments 34a,34b and to move radially inwardly to a greater extent than the inward movement of the segments 34a, 34b. Radially outward movement of the segments 34a, 34 b is begun before beginning movement of the segment 36a, 36b and is completed before the completion of radial outward movement of the segment 36a, 36b.

Referring again to FIG. 1; the rotation of the scroll plate 50a relative to the associated end body is effected by a plurality of shell pinions 80a, preferably four, equally spaced angularly about the axis 44 and each mounted rotatably in and for axial movement with the bushings 81 fixed in the associated end body. Each pinion 80a is in driving engagement with an internal gear 82a formed in the inner circumference of the scroll plate 50a, the two portions of the gear 82a being separated by the previously mentioned annular groove 65. The pinions 90b, in like manner, engage the gear 82b in the scroll plate 50b. The shell pinions 80a, 90b not only effect rotations, when required, of the scroll plates, but also serve to support the scroll plates against radial displacement with respect to the axis 44.

The spiral path described by each groove 54 of the scroll plate, illustrated in FIG. 3, has a rate of rise such as to move the segments 16 outwardly about 0.038 inches per degree of rotation for a total rise of the set of six pairs of segments 34a, 34b of about 2.75 inches.

The pinions 80a, 80b support and are rotated by the four driving shafts 83 parallel to and spaced equally about the center shaft 22. Each shaft 83 is fixed axially of the drum 12 and corotatably and coaxially engages an axially aligned pair of the pinions 80a and 80b mounted in the respective axially movable end bodies 20a and 20b. The bores of each pinion 80a and 80b and the associated shafts 83 are triangular in cross-section, as illustrated in FIGS. 2 and 3, the sides of the triangles being convexly curved.

Figure 5:
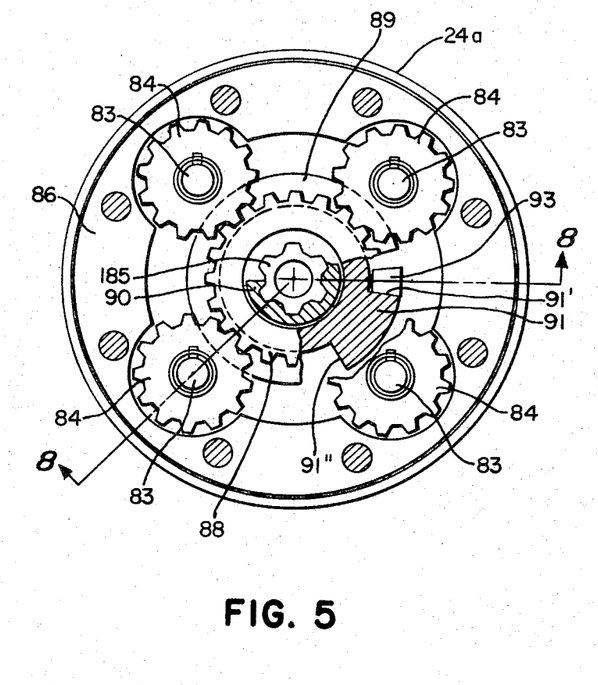
FIG. 5 is a partial and enlarged view of the detail of the apparatus of FIGS. 1 and 2 with reference to the section line 5—5 in FIG. 1.

Referring also to FIG. 5; to rotate the pinion driving shafts 83 in timed relation, each has a drive pinion 84 mounted coaxially and corotatably thereon, the shafts 83 being carried in suitable bearings 85 in the flange 86 of the center shaft 22. The drive pinions 84 are disposed agout two coaxial gears 88, 88' and in driving relation therewith.

Figure 8:
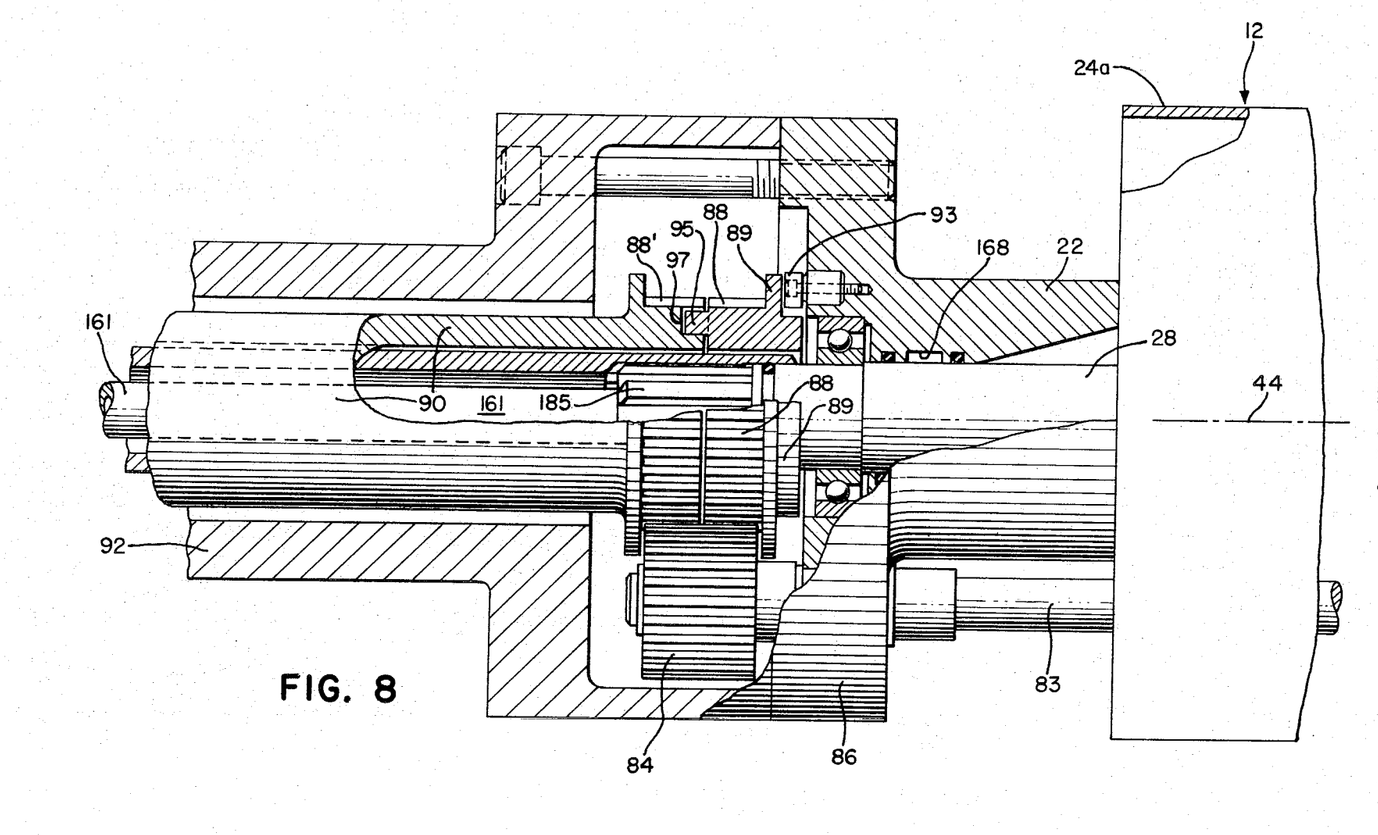
FIG. 8 is a section view of a portion of the apparatus of FIG. 1, with reference to the section line 8—8 in FIG. 5.

Referring to FIGS. 5 and 8; the gears 88 and 88' are of the same form and number of teeth. Both drivingly engage each of the drive pinions 84 which are spaced equally about the coaxial gears 88, 88'. The gear 88 is carried loosely by and rotatable relatively of the shaft 22 to effect rotation of the scrolls 50a, 50b through an angle of about 75°–90° and preferably 80°–82°. To protect the follower pins 52 and the associated parts from over travel, the gear 88 has a coaxial flange 89 carrying a lug 91 extending radially outwardly and circumferentially about 65°–70° between radially disposed abutments 91' and 91" which are respectively engageable with a stud 93 fixed in the flange 86 radially outward of the axis 44 to extend axially into engageable relation with the lug 91. The angular width of the stud 93 plus the angular width of the lug 91 permit the coaxial gears 88, 88' to be rotated through an angle of less than 360°and prevent rotation beyond the angle of rotation required to lift or lower the segments 16. The width of the lug 91 is selected to suit the selected gear train ratio for the particular drum. The permitted angle of rotation may range from about 150° to about 320°.

The coaxial gear 88' is mounted on or made an integral part of a coaxial drive sleeve 90 carried on suitable bearings within the main spindle 92 of the apparatus 10 in order to communicate driving effort from remote drive means (not shown), to the scroll plates 50a, 50b.

When the drum 12 is removed from and replaced in the apparatus 10, the correct timing or angular relation between the rise and fall of the segments 16 and the rotation of the drive gear 88' with its driving motor, is maintained by positive angular locating means in the form of an axial projection 95 integral with the gear 88 interengaging a recess 97 conforming to the projection 95, formed in the gear 88'. By providing a single projection 95 and cooperating recess 97, the gears 88 and 88' cannot be axially moved into operative position except by interengaging the projection 95 and the recess 97 in a single correct angular location.

With reference again to FIG. 1; a cylindrical housing 24a, 14b is airtightly to each end body 20a, 20b and extends axially outward. The housing 24a has a flanged portion 102a at its proximate end which accommodates a plurality of radially extending bores 105 spaced angularly about the axis 44, and a second flange 107 extending radially inwardly of the housing to engage slidably and airtightly the center shaft 22. The housing is preferably made of metal such as aluminum alloy has a coaxial bore 110 provided with a bushing 112. A rigid annular member 114 comprises a piston portion 114' and a guide portion 114'' of diameter smaller than the piston portion, the guide portion conforming to the inner cylindrical surface of the bushing 112. The piston portion 114' slides in a coaxial enlarged cylindrical bore 110' in the housing extending axially inward from the bore 110. The members 114 are moved axially toward the respective end bodies by compressed air admitted into the chambers 116a, 116b by way of the telescopically sliding tubes 118a, 118b fixed one in the flange 86, the other in the end cap 119, and slidable in the air seals 121 affixed in the respective housing. A plurality of springs 123 spaced equiangularly about the axis are mounted respectively in recesses 125 in the end body and cooperating recesses 127 in the annular member 114 to urge the annular member axially away from the respective end body.

Figure 7:
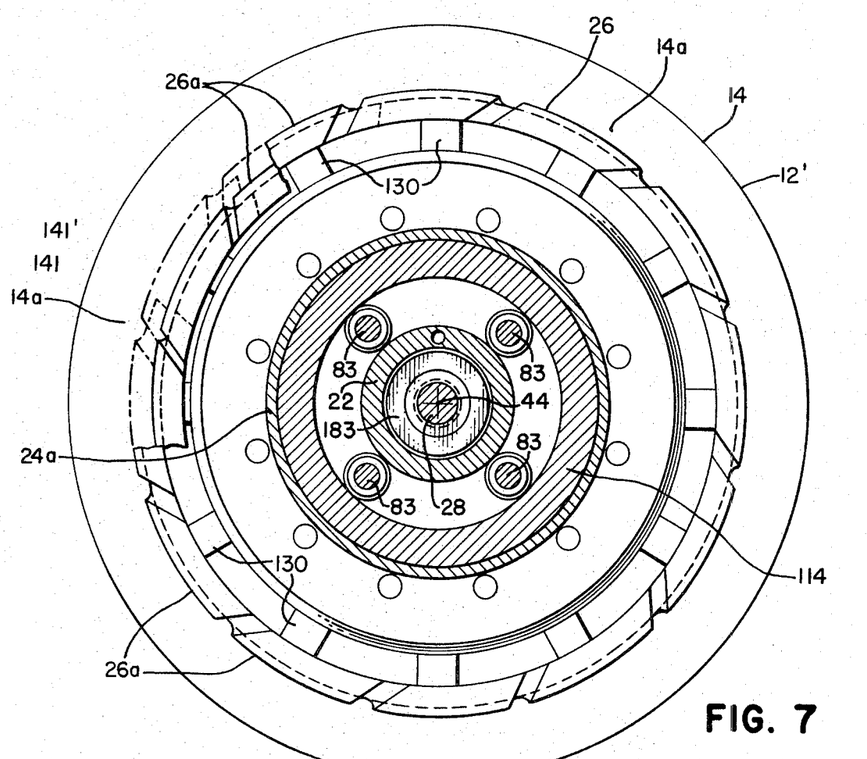

Referring to FIGS. 6 and 7; a plurality of identical bead segment pistons 130 are disposed one in each of the radial bores 105 and provided with a suitable air seal in the form of an O-ring 131. The radially inner end of each piston is provided with a pin connection in the form of a transverse slot 132 parallel to the axis 44 and a pivot pin 133 perpendicular to the slot. Each annular member 114 at its proximate end has a plurality of radial slots 136 each in coplanar axial alignment with a slot 132 in a respectively associated piston 130 and a pin 137 extending perpendicularly across each slot 136. Each piston pin 133 is connected with the associated pin 137 by a rigid link by which the pistons 130 are moved radially with respect to the axis 44 and are maintained radially equidistant therefrom during any axial movement of the annular member 114.

The bead engaging and locating segments 26a and 26b each having a circumferential surface conforming to the inner circumference of a bead portion of the tire are removably secured to the respective pistons 130. The arcuate end portions 140 of each bead segment terminate at planes oblique to the drum axis. The end surfaces 141 are configured to overlie corresponding end surfaces 141' of respectively adjacent segments in a pattern repeated about the circumference of each group of segments 26a, 26b.

In order to prevent possible interference between the bead locating segments 26a, 26b and the sleeve endings 14a, 14b during the respective movements thereof, a thin annular plate 150a, 150b (best seen in FIG. 1), which can be integral with the housing 24a, 24b, is disposed coaxially between the axially inner faces of the bead locating segments and the immediately adjacent sleeve ending. The plate 150a, 150b, which is radially fixed, extends radially outward beyond the minimum radius assumed by the bead locating segments in their collapsed or radially inward position.

The sleeve 14, the end bodies 20a, 20b, and the housings 24a, 24b cooperate with the center shaft 22 to form a chamber 160 into which compressed air can be admitted and from which air can be released. Compressed air is admitted to the chamber by way of a coaxially mounted tube 161 (see FIG. 8) extending axially through the spindle 92 and connected to the tube 163 mounted coaxially in the axial drive screw 28. A port 164 in the screw passes air to and from the chamber 160. A second air passage 165 is provided by the annular space between the tube 163 and the wall 166 of the screw 28 which communicates by way of the port 167 and the annular channel 168 formed in the center shaft 22 to the air passage 170 extending longitudinally in the wall of the center shaft communicating with a radial passage 171 in the flange 86 and with a like passage 172 in the end cap 119. Air is communicated by the radial passages 171, 172 to the previously mentioned telescoping tubes 118a, 118b by which compressed air is admitted to operate the pistons 114' and the bead locating segments 26a, 26b.

In order to move the end bodies 20a, 20b toward and away from each other, each is provided with a fixture 180 including keys 181 which extend through elongate axial slots 182 in the center shaft 22. Each key 181 is attached securely to a thimble 183 which retains a nut 184 having threads corresponding to the associated screw portion and by which the end body is moved in response to rotation of the screw 28.

During axial movement of the end bodies 20a, 20b, as well as radial movement of the segment 16, the cover plates 18 are maintained in axially centralized positions by centering means including a center body 191 fixed on the shaft 22 and having angularly equally spaced coplanar bores 192 extending radially of the axis 44 in which the guide rods 193 affixed respectively to the cover plates 18 are slidable. The guide rods 193 and the cover plates 18 are biased inwardly by a garter spring 194 of rubber-like elastic retained in the notches 195 formed in the radially outer ends of the rods. The cover plates are each attached by screws or the like respectively to the outer ends of the rods. The keys 196 fixed in the body 191 each engage a slot 197 in each rod 193 to keep them from turning in the respective bore 192.

In a preferred mode of operation of the apparatus which has been described, a previously formed endless band including a carcass ply is positioned in cylindrical undeformed concentric relation about the drum 12 while the latter is in its fully collapsed state indicated by phantom outline 200 in FIG. 1. The drum is then expanded into its intermediate cylindrical condition 12' as seen in FIG. 1, the intermediate portion of the band, including the ply, thereupon being expanded slightly leaving the ply endings overhanging the axial ends or shoulders of the drum. The drum is expanded to its intermediate condition by revolving the pinion driving shafts 83 and the pinions 80a, 80b thereon. The gears 82a, 82b rotate the scroll plates 50a, 50b coaxially, relatively of the respective end bodies 20a, 20b. The spiral cam grooves 54 engaging the cam follower pins 52 urge the segments 16 and the cover plates 18 radially outward. The radial expansion described is independent of any axial movement of the end bodies 20a and 20b, and the segments 16 and 26 mounted thereon do not move axially toward each other. The sleeve 14 is stretched axially as well as expanded radially since the ends 14a and 14b are not moved toward each other. By known methods and means, and ply ends are turned inward, beads placed, and the ply ends are turned thereabout in a conventional manner. As the beads are placed in axial registry over the respective segments 26a, 26b, these are moved radially outwardly to grip the carcass holding the bead portions concentric to the axis.

The ply endings are turned about the beads and stitched onto the intermediate portion of the ply band while the drum is in the intermediate condition. During this period, additional components of the tire, such as, for example, shoulder wedge strips, or portions of the sidewall of the tire, may be added in a conventional manner. The end bodies 20a, 20b and the bead centering segments 26 are then moved toward one another coaxially while concurrently compressed air is admitted into the chamber 160 to shape the tire and the sleeve 14 contiguous therewith into a toroidal condition to receive an inextensible belt circumferentially therearound and a tread. While the belt and tread are stitched into consolidated relation with the carcass, as well as during the change of condition of the drum from cylindrical to toroidal, to shape the carcass thereon, the bead locating segments, particularly the raised shoulder portions 26' thereon, cooperate with the sleeve ends 14a, 14b respectively to prevent the dislodgment of either or both beads from their appropriate relation in the tire carcass. The air pressure acting outwardly on the sleeve portions 14a, 14b tends effectively to hold the beads in place on the segments 26 and against the shoulders 26'.

After the tire is formed, the sleeve 14 is collapsed by reducing the air pressure within the chamber to or below the ambient atmospheric pressure while the segments and cover plates are concurrently collapsed by rotation of the scroll plates and the bead centering segments likewise moved radially inwardly out of contact with the tire. The end bodies, being held axially fixed during the radial collapse of the sleeve 14 and aegments 16, are then moved axially away from each other returning the drum to its first condition 200 as shown in the dashed outline of FIG. 1. The tire is then removed and the drum is ready to repeat the cycle described.

The tire building drum according to the invention provides a number of features and advantages not heretofore effectively available. The drum provides an unusually high crown, a radial rise of the drum surface with respect to the radius of the bead of the tire to be built, as well as a continuous cylindrical firm support for the tire building sleeve while the same is in a cylindrical condition. Means for elevating the support segments in the form of the scroll plates described provide a high mechanical advantage as well as a relatively high rise for the segments and maintain the cylindrical surface positively concentric with the drum axis. Building drums in which the surface is supported only, or chiefly by pneumatically expanding means, cannot afford this advantage.

The mounting of the scroll plates each to move together with the respective end bodies enables the latter to be moved toward and away from each other concurrently with or independently of the radial movement of the segments over a wide range of axial movement. Moreover, the range of movement provided by the scroll plates enables greater reduction in diameter thereby permitting a finished tire to be readily removed from the drum. The bead locating segments 26, by cooperating with the ends of the sleeve 14 and with the air pressure within the chamber, hold the beads of the tire in positive concentricity and axial location against any tendency of stitching effort to dislodge the beads axially or radially both during approach of the beads toward one another during shaping and while in the fully expanded toroidal condition of the drum. The relatively greater crown rise of the drum enables an endless band to be positioned about the drum at a greater diameter providing thereby an advantage in maintaining the reinforcement cords or wires of the ply more closely spaced in the crown of the tire contrasted with the previous practice of applying the ply to a drum at a lesser crown or a crown diameter equal to or less than the bead diameter. The interengagement of the cover plates 18 to provide positive axial and radial correlation between the cover plates and the respectively associated segments 16 provides a particular advantage in the drum according to the invention by maintaining the alignment of the cover plates 18 both with the segments 16 and with the axis during any movements of either.

While certain representative embodiments and details have been shown for the purpose of illustrating the invention, it will be apparent to those skilled in the art that various changes and modifications may be made therein without departing from the spirit or scope of the invention.

What is claimed is:

1. In tire building apparatus for building a tire having therein a circumferentially inextensible belt;

a building drum comprising an expansible sleeve providing a continuous exterior surface for contiguously supporting said tire and terminating in radially fixed inwardly turned ends;

a hollow cylindrical center shaft disposed coaxially within said sleeve and extending axially outwardly of said ends;

a pair of rigid end bodies mounted coaxially and corotatably on said shaft for movement toward and away from each other, said ends being secured respectively to said bodies;

a plurality of rigid interior support segments mounted within said sleeve on each of said bodies for movement radially of the drum rotation axis and cooperable to provide in one condition of said drum firm continuous cylindrical support to said sleeve between said ends; and a plurality of bead locating segments disposed close to and axially fixed outwardly of each of said inwardly turned ends and supported for movement radially of the drum axis, a rigid annular member mounted outwardly of each of said ends for coaxial movement toward and away from the respectively associated end, and a plurality of rigid links each pin-connected to one said member and respectively to one of said bead locating segments to maintain the segments concentric with the drum axis.

2. Apparatus as claimed in claim 1, including a cylindrical housing having a flange portion at the proximate end thereof secured airtightly to each of said end bodies and a second flange portion airtightly and slidably engaging said center shaft axially outwardly of the respective end body, said housing being provided with a coaxial cylindrical bore therein, said rigid annular member comprising a piston slidable in said bore in response to change in air pressure within said bore.

3. Apparatus as claimed in claim 2, the first said flange portion extending radially outwardly about said housing and comprising a plurality of cylindrical bores equally spaced angularly about and extending radially of said axis, a plurality of pistons each mounted slidably in a respectively associated bore, each of said bead locating segments being mounted on the radially outward end of the respectively associated one of said pistons, said bead locating segments being provided with bead locating surfaces, the latter said surfaces each being shaped to conform circumferentially to the radially inner surface of a bead for said tire.

4. Apparatus as claimed in claim 3, said bead locating surfaces each including a surface portion extending radially outward of the minimum diameter of such bead and cooperable with said sleeve while the latter is in a radially expanded condition to resist dislodgment of said bead.

5. In tire building apparatus for building a tire having therein a circumferentially inextensible belt;
a building drum comprising an expansible sleeve providing a continuous exterior surface for contiguously supporting said tire and terminating in radially fixed inwardly turned ends;
a hollow continuous cylindrical center shaft disposed coaxially within said sleeve and extending axially outwardly of said ends;
a pair of rigid end bodies mounted coaxially on and corotatably with said shaft for sliding movement toward and away from each other on said shaft, said ends being secured in radially fixed relation respectively to said end bodies;
a plurality of rigid interior support segments, including a first set of greater arcuate width and a second set of lesser arcuate width disposed in alternating sequence circumferentially about each said end body and mounted within said sleeve on each of said bodies for movement radially of the drum rotation axis and cooperable to provide in one condition of said drum firm continuous cylindrical support to said sleeve between said ends;
means for moving said segments radially comprising a scroll plate carried by each of said end bodies for coaxial movement respectively therewith and for rotation relative to said end bodies about said axis;
each of said end bodies comprising a plurality of guideways extending radially of the axis, each of said interior support segments having a guide member extending radially of the axis slidable radially in the respectively associated guideway;
groove follower means on each said guide member and cam groove means on each said scroll plate cooperably interengaging to move said segments radially of the axis in response to rotation of said scroll plate; and
means on each said scroll plate comprising an annular groove concentric therewith and a plurality of wheels mounted on each respectively associated end body, said wheels having peripheral rims interengaging said annular groove and cooperable to move said scroll plate axially of the drum together with such end body and to accommodate relative rotation of said scroll plate with respect to said end body.

6. Apparatus as claimed in claim 5,
said cam groove means comprising a plurality of grooves extending in coplanar spiral paths spaced angularly about each respective scroll plate, said follower means on said radial guide members each engaging respectively one of said grooves; and
said plurality of grooves comprising a first set of grooves associated with said first set of segments and a second set of grooves associated respectively with said second set of segments.

7. Apparatus as claimed in claim 6, said scroll plates being rotatable through an arc of from 75° to 90°.

8. Apparatus as claimed in claim 6, said scroll plate being rotatable through an arc of from 80° to 82°.

9. Apparatus as claimed in claim 6, the radially outward portions of said grooves being equally distant from and extending along circular arcs concentrically about said axis, and the radially inward portions of said second set of grooves extending radially inwardly with respect to the radially inward portions of said first set of grooves and extending along circular arcs concentric with said axis.

10. Apparatus as claimed in claim 6, each said scroll plate having gear means thereon, scroll drive means carried by said end bodies for driving engagement with each said gear means to effect rotation of said scroll plate.

11. Apparatus as claimed in claim 10, said scroll drive means comprising a plurality of pinion drive shafts extending parallel to said center shaft and rotatable about pinion axes spaced angularly thereabout, and a plurality of shell pinions mounted rotatably in the respectively associated end body, each being corotatable with and coaxially slidable along a respectively associated one of said drive shafts;
and means connected to said pinion drive shafts for effecting rotation thereof about said pinion axes.

12. Apparatus as claimed in claim 11, said means for effecting rotation of said pinion drive shafts comprising a plurality of drive pinions mounted on said center shaft each of said drive pinions being coupled coaxially with a respectively associated pinion drive shaft for corotation therewith.

13. Apparatus as claimed in claim 12, said means to effect rotation of said pinion drive shafts comprising a drive gear mounted for rotation coaxially of said center shaft annd drivingly meshed with each of said drive pinions.

14. In tire building apparatus for building a tire having therein a circumferentially inextensible belt;
a building drum comprising an expansible sleeve providing a continuous exterior surface for contiguously supporting said tire and terminating in radially fixed inwardly turned ends;

a hollow cylindrical center shaft disposed coaxially within said sleeve and extending axially outwardly of said ends;

a pair of rigid end bodies mounted coaxially and corotatably on said shaft for movement toward and away from each other, said ends being secured respectively to said bodies;

a plurality of rigid interior support segments mounted within said sleeve on each of said bodies for movement radially of the drum rotation axis and cooperable to provide in one condition of said drum firm continuous cylindrical support to said sleeve between said ends;

said plurality of support segments comprising a first set of greater arcuate width and a second set of lesser arcuate width disposed in alternating circumferential sequence about each of said end bodies; and a plurality of cover plates each extending axially of the drum and overlying an opposed pair of said support segments including a first set of cover plates each having axially extending edge portions overlying the adjacent axially extending edges of the respectively circumferentially adjacent pairs of the second set of segments, and a second set of cover plates each having axially extending edge portions, the latter said edge portions each slidably interengaging the respectively associated pair of the second set of support segments, and radially inwardly of the corresponding edge portions of said first set of cover plates.

15. Apparatus as claimed in claim 14, each support segment of said second set comprising a parallel pair of slots extending axially of the drum, each of said second set of cover plates having respectively opposite edge portions turned inwardly and slidably engageable in the respectively associated slots of said second set of segments.

16. Apparatus as claimed in claim 15, each of said slots extending inwardly of the circumferential surface of the respectively associated segment at an acute angle with respect to an axial plane aligned with the slot, the slots of a pair thereof in each such segment being in opposing angular relation with respect to each other.

17. Apparatus as claimed in claim 16, including centering means in said drum cooperating with said cover plates to maintain the same disposed in fixed axial relation with said center shaft and the mid-circumferential plane of said drum during movement of said support segments.

18. Apparatus as claimed in claim 17, said centering means comprising a center body fixed symmetrically with respect to said mid-circumferential plane on said center shaft, a plurality of radially extending bores spaced angularly about said axis in said center body, a plurality of rods slidably disposed one in each of said bores, garterspring means disposed about the radially outward end portions of said rods to urge the same radially inwardly, and means securing each of said cover plates respectively to one of said rods.

19. Apparatus as claimed in claim 18, said sleeve comprising a radially expansible cylindrical tubular member of limited axial extensibility, said sleeve cooperating with said end bodies to define a deformable chamber, and means communicating with said chamber to supply compressed air therein to expand said sleeve into toroidal shape during movement of said end bodies toward each other.

20. In tire building apparatus for building a tire having therein a circumferentially inextensible belt;

a building drum comprising an expansible sleeve providing a surface for supporting said tire and terminating in radially fixed inwardly turned ends;

a shaft disposed coaxially within said sleeve and extending axially outwardly of said ends;

a pair of rigid annular integral end bodies mounted coaxially and corotatably on said shaft for movement toward and away from each other, said ends being secured in radially fixed relation respectively to said bodies;

a plurality of rigid interior support segments including a first set of greater arcuate width and a second set of lesser arcuate width disposed in alternating sequence circumferentially about each said end body and mounted within said sleeve on each of said bodies for movement radially of the drum rotation axis and cooperable to provide in one condition of said drum firm continuous cylindrical support to said sleeve between said ends; and means for moving said segments radially, and gear means for actuating said means for moving, said gear means comprising a gear mounted coaxially on said shaft for rotation relative thereto, angular movement limiting means corotatable with said gear and stop means fixed eccentrically of the axis on said shaft, said limiting means and said stop means being cooperable to stop angular rotation of said gear relative to said shaft in clockwise and anticlockwise directions after an angular displacement of said means for moving said segments about said axis.

21. Apparatus as claimed in claim 20, said limiting means comprising a lug extending radially of said gear, said stop means comprising a stud projecting axially of an end face of said shaft, said lug having two radially disposed abutments spaced arcuately about said axis, each abutment engaging said stud to stop rotation of said gear in one rotational sense.

22. Apparatus as claimed in claim 21, said lug extending angularly between said two abutments to limit said rotation to an angle between 150° and 320°.

23. In tire building apparatus for building a tire having therein a circumferentially inextensible belt;

a building drum comprising an expansible sleeve providing a continuous exterior surface for contiguously supporting said tire and terminating in radially fixed inwardly turned ends;

a hollow cylindrical center shaft disposed coaxially within said sleeve and extending axially outwardly of said ends;

a pair of rigid end bodies mounted coaxially and corotatably on said shaft for movement toward and away from each other, said ends being secured respectively to said bodies;

a plurality of rigid interior support segments mounted within said sleeve on each of said bodies for movement radially of the drum rotation axis and cooperable to provide in one condition of said drum firm continuous cylindrical support to said sleeve between said ends; and means for moving said segments radially including gear means for actuating said means for moving, said gear means comprising a gear mounted coaxially on said center shaft for rotation relative thereto, said center shaft having means for securing the same coaxially and corotatably on a spindle, said gear means further including a gear mounted coaxially on said spindle for rotation relatively thereto and positive locating means for angularly corelating said gear on said shaft with said gear on said spindle at a single selected angular relation while mounting said shaft on said spindle.

24. Apparatus as claimed in claim 23, said positive locating means comprising a projection extending axially of one said gear and a conforming recess extending axially of the other said gear, the projection and the recess interengageable only in a single angular relation of the one and the other said gear.

25. Apparatus as claimed in claim 23, each said gear having the same number and form of teeth and being drivably engageable with a single additional gear.

26. In tire building apparatus for building a tire, a building drum comprising an expansible sleeve, terminating in radially fixed inwardly turned ends, a plurality of rigid interior support segments mounted within said sleeve for movement radially of the drum rotation axis and associated respectively with each of said ends, and a plurality of cover plates each overlying axially of the drum an opposed pair of said support segments including a first set of cover plates each having edge portions overlying the adjacent edges of the respectively circumferentially adjacent pairs of segments and a second set of cover plates each having edge portions, the latter said edge portions each slidably interengaging the respectively associated pair of said segments, and radially inwardly of the corresponding edge portions of said first set of cover plates.

27. Apparatus as claimed in claim 26, said plurality of support segments comprising a first set of greater arcuate width and a second set of lesser arcuate width disposed in alternating circumferential sequence about said axis, each support segment of said second set comprising an axially extending parallel pair of slots, each of said second set of cover plates having respectively opposite axially extending edge portions turned inwardly and slidably engageable in the respectively associated slots of said second set of segments.

28. Apparatus as claimed in claim 27, each of said slots extending inwardly of the circumferential surface of the respectively associated segment at an acute angle with respect to an axial plane aligned with the slot, the slots of such pair in each such segment being in opposing angular relation with respect to each other.

* * * * *